United States Patent [19]

Williams

[11] Patent Number: 4,621,924
[45] Date of Patent: Nov. 11, 1986

[54] OPTICAL ALIGNMENT APPARATUS

[75] Inventor: Samuel G. L. Williams, Palo Alto, Calif.

[73] Assignee: Lockheed Missiles & Space Company, Inc., Sunnyvale, Calif.

[21] Appl. No.: 682,620

[22] Filed: Dec. 17, 1984

[51] Int. Cl.$^4$ .............................................. G01B 11/26
[52] U.S. Cl. ..................... 356/153; 356/127
[58] Field of Search ............... 356/127, 153, 399, 400; 33/286

[56] References Cited

U.S. PATENT DOCUMENTS 3,942,894  3/1976  Maier .................................. 356/153

Primary Examiner—R. A. Rosenberger
Assistant Examiner—Crystal D. Cooper
Attorney, Agent, or Firm—John J. Morrissey

[57] ABSTRACT

An apparatus for indicating misalignment of the optical elements of an optical system (10) comprises a source (11) of optical radiation (which is in general nonpolarized), a beam splitter (12), an optical flat (13) and an off-axis beam sampling device (14). The beam splitter (12) divides an input beam (20) from the source (11) into a transmitted component (21) which passes along the optic axis of the optical system (10) to the optical flat (13), and a reflected component (22) which passes to the off-axis beam sampling device (14). The beam sampling device (14) divides the reflected component (22) of the input beam (20) into two angularly separated beams (24) and (25), which are returned to the beam splitter (12). The beam splitter (12) transmits components (24') and (25'), respectively, of the angularly separated beams (24) and (25) to a detector plane (23). When the optical elements of the system (10) are properly aligned, the optical flat (13) reflects the transmitted component (21) of the input beam (20) back along the optic axis to the beam splitter (12), which reflects a component (21') of the transmitted component (21) to the detector plane so that the components (24') and (25') are angularly deviated by equal amounts, but on symmetrically opposite sides, from the component (21'). However, when there is a significant misalignment of the optical elements of the system (10), the transmitted component (21) is reflected by the optical flat (13) along a path off the optic axis of the system (10). Consequently, the beam splitter (12) reflects the component (21') of the transmitted component (21) to a different position on the detector plane (23) than the position to which the component (21') would be reflected if the optical elements were properly aligned. Quadrant detectors (27), (28) and (29) at the detector plane (23) sense any difference between the angular deviations of the components (24') and (25') from the component (21'), and thereby provide a measure of the misalignment of the optical elements of the system (10).

8 Claims, 5 Drawing Figures

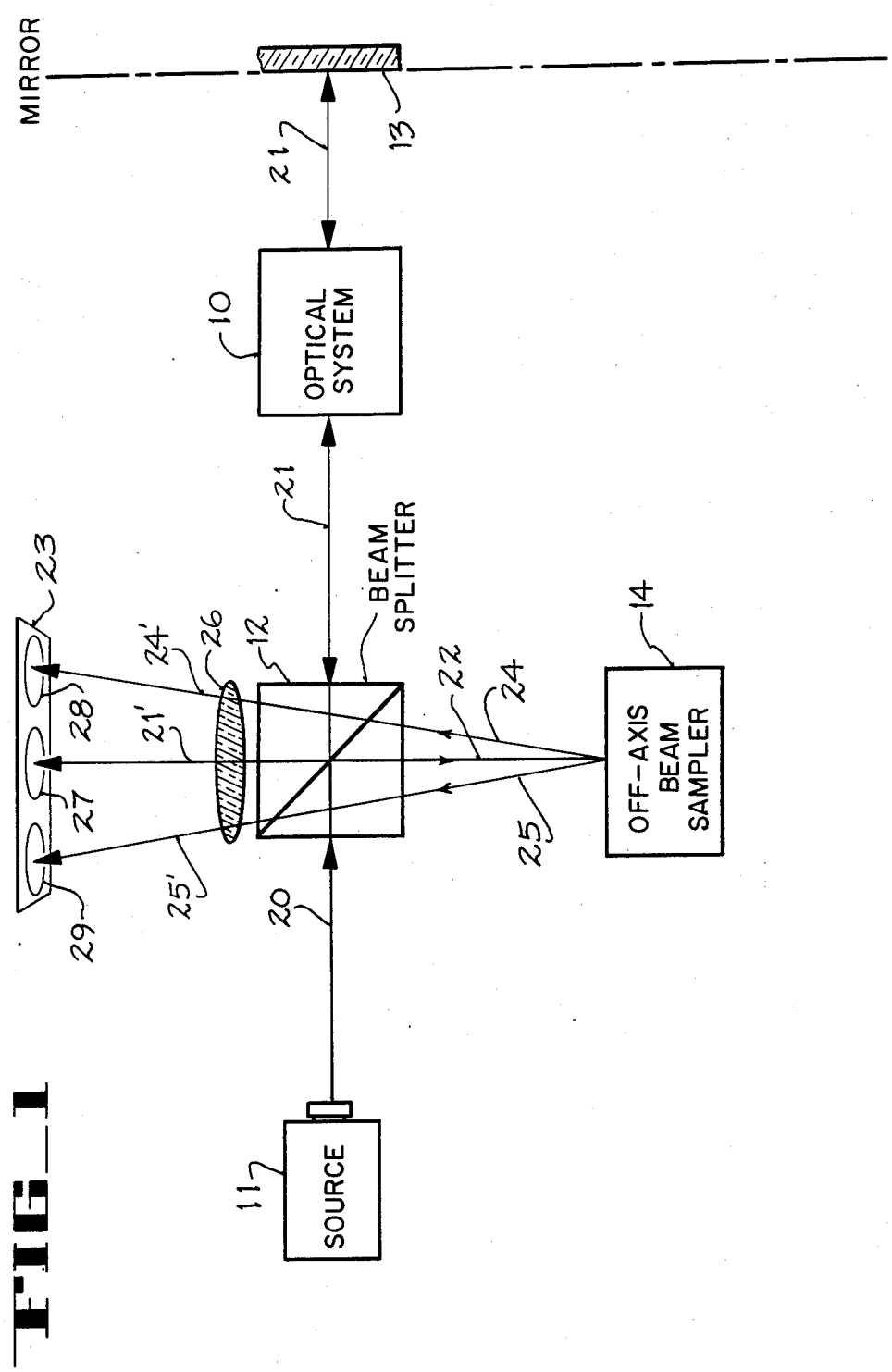

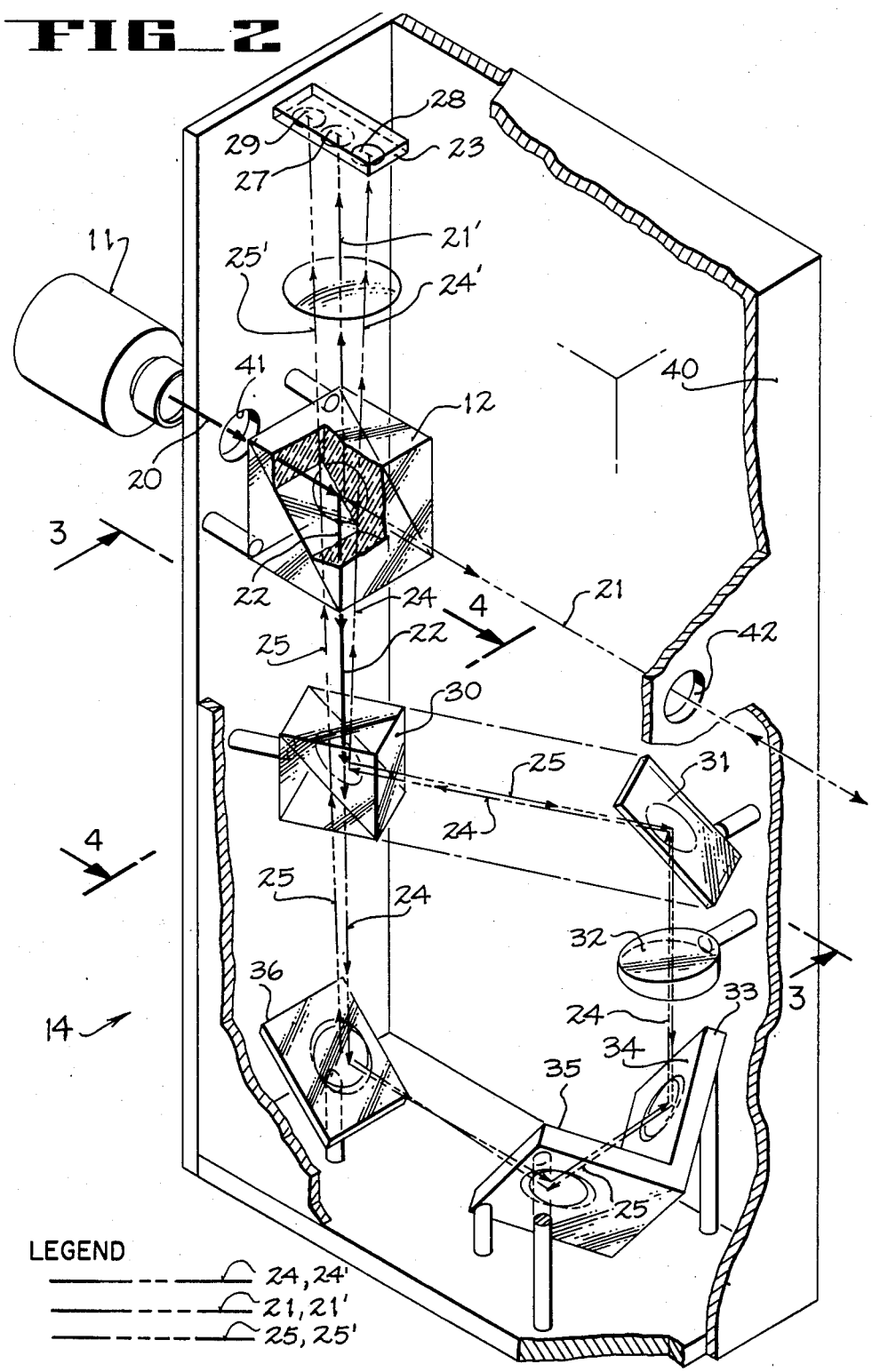

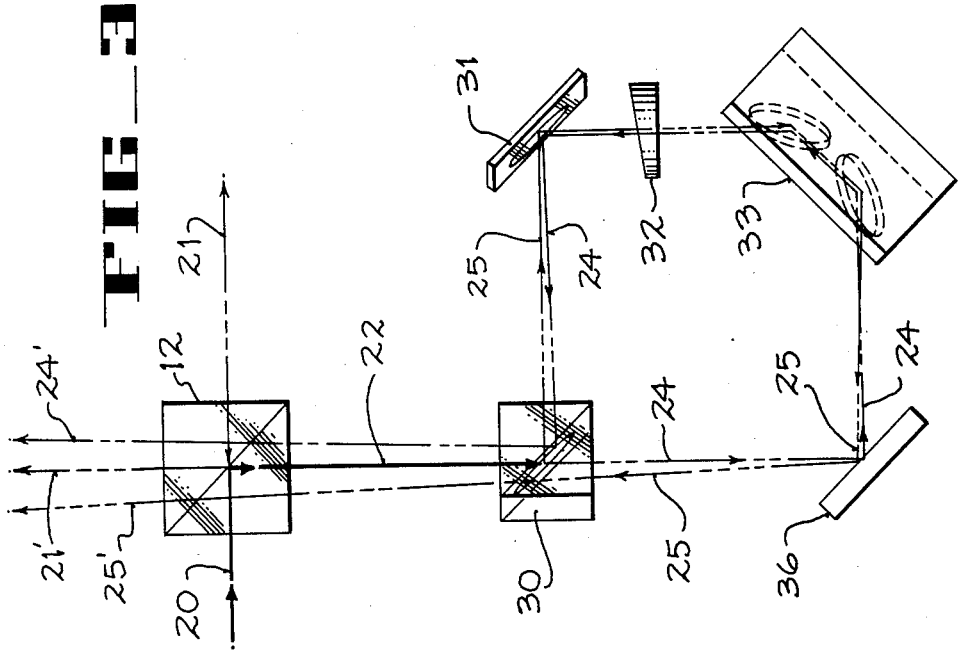
FIG_3
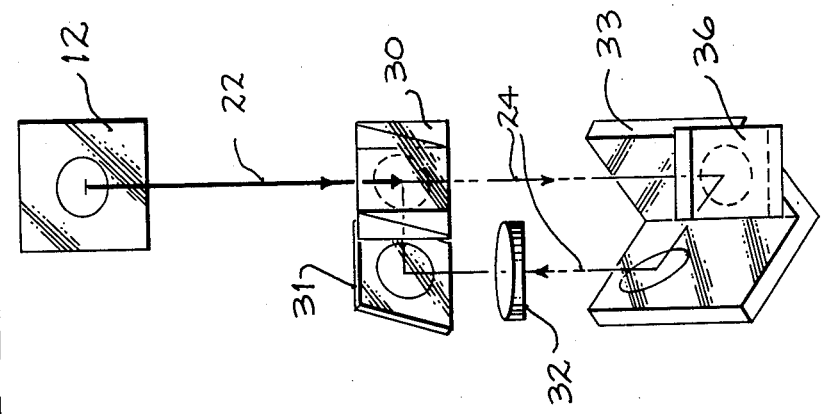
FIG_4

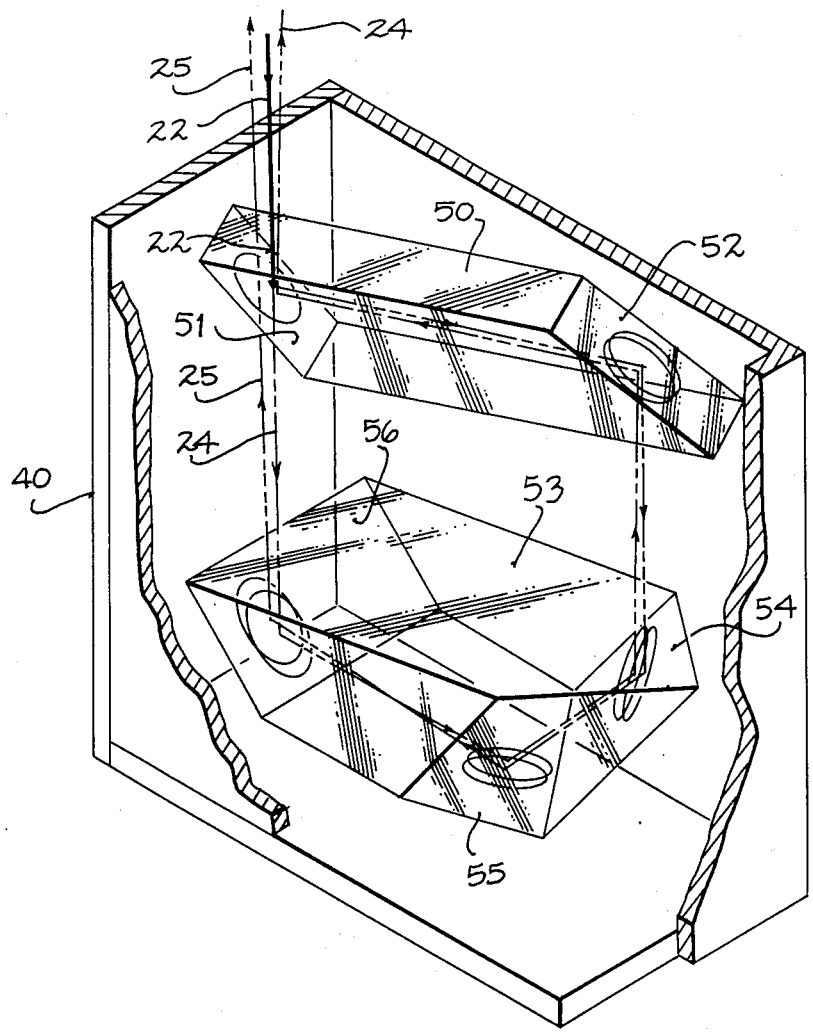
FIG_5

OPTICAL ALIGNMENT APPARATUS

U.S. GOVERNMENT RIGHTS

The Government has rights in this invention pursuant to Contract F29601-82-C-0098 awarded by the Department of the Air Force.

TECHNICAL FIELD

This invention pertains to the alignment of optical elements in an optical system.

BACKGROUND ART

According to conventional techniques for aligning optical elements in an optical system (e.g., in a telescope), a beam splitter and a retroreflector are used in conjunction with photodetectors to detect any deviation that misaligned optical elements would cause between an input beam and a reflected return beam passing through the system. In order to distinguish the return beam from the input beam, it has generally been necessary in conventional techniques for the input beam to be polarized so that the return beam can be distinguished by its phase change upon reflection.

SUMMARY OF THE INVENTION

The present invention facilitates tne alignment of optical elements in an optical system by permitting use of an unpolarized input beam. The unpolarized input beam is split into two components, viz., a first component that is transmitted through the optical system along the optic axis of the elements that are to be aligned, and a second component that is reflected to an off-axis beam sampling device. The first component, after passing through the optical system, is reflected back through the system to provide a return beam. The second component is divided by the off-axis beam sampling device into two angularly separated beams, which are compared with the return beam to indicate any misalignment of the elements of the optical system.

An optical alignment apparatus according to the present invention comprises a first beam splitter, which transmits the first component of the input beam to an optical flat, and which reflects the second component of the input beam to the off-axis beam sampling device. The optical system whose elements are to be aligned is positioned between the first beam splitter and the optical flat so that the optic axis of the optical system coincides with the first (i.e., transmitted) component of the input beam.

The optical flat is perpendicular to the optic axis of the optical system, so that the transmitted component of the input beam is normal to the optical flat when the elements of the optical system are perfectly aligned along the optic axis. The transmitted component of the input beam is returned through the optical system to the first beam splitter by reflection from the optical flat. A portion of the transmitted component of the input beam, after returning through the optical system, is then reflected by the first beam splitter and focused upon a detector plane. That portion of the transmitted component which is focussed upon the detector plane is designated as the return beam.

In a particular embodiment of the invention, the first beam splitter is oriented so that the return beam passes to the detector plane along a path that is perpendicular to the optic axis of the system whose optical elements are to be aligned. Simultaneously, the reflected component of the input beam passes to the off-axis beam sampling device along a path that is perpendicular to the optic axis of the system and is collinear (but in the opposite direction) with respect to the return beam. In an embodiment of the invention in which the path of the return beam to the detector plane is not perpendicular to the optic axis, the reflected component of the input beam to the off-axis beam sampling device is, in any event, collinear (but in the opposite direction) with respect to the return beam.

The off-axis beam sampling device comprises a second beam splitter, a first planar mirror, an optical wedge, a roof mirror and a second planar mirror, which divide the reflected component of the input beam into two angularly separated beams that are returned through the first beam splitter and focussed upon the detector plane. The return beam from the optical flat and the two angularly separated beams from the off-axis beam sampling device are focussed at different locations upon the detector plane. Conventional detectors (e.g., quadrant detectors) are located at the detector plane to detect the positions at which the centroids of the return beam and of the two angularly separated beams are focussed upon the detector plane.

If the elements of the optical system through which the first component of the input beam is transmitted are precisely aligned along the optic axis, the two angularly separated beams from the off-axis beam sampling device have symmetrical angular separations on opposite sides of the return beam. However, if a significant misalignment of the elements of the optical system has occurred, the two angularly separated beams from the off-axis beam sampling device have different angular separations on opposite sides of the return beam. The difference between the angular separations of the two angularly separated beams from the return beam provides a measure of the misalignment of the elements of the optical system.

DESCRIPTION OF THE DRAWING

FIG. 1 is a schematic illustration of an optical alignment apparatus according to the present invention.

FIG. 2 is cut-away perspective view of an optical alignment apparatus according to the present invention.

FIG. 3 is a view of the optical alignment apparatus of the present invention in orthographic projection along line 3—3 of FIG. 2.

FIG. 4 is a view of the optical alignment apparatus of the present invention in orthographic projection along line 4—4 of FIG. 2.

FIG. 5 is a cut-away perspective view of an alternative embodiment of the off-axis beam sampling device of an optical alignment apparatus according to the present invention.

BEST MODE OF CARRYING OUT THE INVENTION

As indicated schematically in FIG. 1, an optical system 10 (which may be a conventional optical system such as, e.g., a telescope) comprises a number of optical elements that must be aligned with respect to each other along an optic axis. According to the present invention, an alignment apparatus is provided for determining whether the optical elements of the system 10 are properly aligned.

The optical alignment apparatus of the present invention as illustrated in FIG. 1 comprises a source 11 of optical radiation (which need not be polarized), a first beam splitter 12, an optical flat 13, and an off-axis beam sampling device 14. The source 11, which may be an extended object or a point object, produces an input beam 20, which is directed toward the optical flat 13. The first beam splitter 12 is interposed in the input beam 20 between the source 11 and the optical flat 13 to produce a first component 21 that is transmitted to the optical flat 13, and a second component 22 that is reflected to the off-axis beam sampling device 14.

In the absence of the optical system 10, the transmitted component 21 of the input beam 20 would pass along a path so as to impinge perpendicularly upon the optical flat 13, whereupon the transmitted component 21 would be reflected back along the same path to the first beam splitter 12. A portion of the transmitted component 21, after being reflected from the optical flat 13, would then be reflected by the first beam splitter 12 toward a detector plane 23. This portion of the transmitted component 21 that is reflected toward the detector plane 23 is called a "return beam" 21'. In the illustrated embodiment of FIG. 1, the return beam 21' is reflected by the first beam splitter 12 perpendicularly with respect to the input beam 20.

When the optical system 10 is to be tested for alignment of its constituent optical elements, the system 10 is interposed in the transmitted component 21 of the input beam 20 between the first beam splitter 12 and the optical flat 13 in such a way that the optic axis of the system 10 coincides with the path of the transmitted component 21. If the optical elements of the system 10 are properly aligned, the transmitted component 21 passes along the optic axis of the system 10 and impinges perpendicularly upon the optical flat 13 as if the system 10 had not been interposed between the first beam splitter 12 and the optical flat 13. As a consequence, the transmitted component 21 is reflected back through the optical system 10 along the optic axis to the first beam splitter 12. The angle of the return beam 21' with respect to the optic axis is determined by the orientation of the first beam splitter 12.

The transmitted component 21 when reflected from the optical flat 13 back to the first beam splitter 12 is precisely antiparallel (i.e., collinear but opposite in direction) to the transmitted component 21 when passing from the first beam splitter 12 to the optical flat 21, unless a misalignment of the optical elements of the system 10 has occurred. Properly aligned optical elements of the system 10 do not cause any change in the direction of the return beam 21' from the direction that the return beam 21' would assume in the absence of the system 10. However, if the optical elements of the system 10 are misaligned, the transmitted component 21 is deviated from the optic axis of the system 10, and thus impinges upon the optical flat 13 at a non-90° angle. Consequently, the transmitted component 21 is reflected from the optical flat 13 through the system 10 back to the first beam splitter 12 along a path away from the optic axis. The first beam splitter 12 thereupon reflects the return beam 21' to a place on the detector plane 23 that is different from the place to which the return beam 21' would be reflected in the absence of the system 10, or in the presence of the system 10 having properly aligned optical elements.

As the transmitted component 21 of the input beam 20 passes toward the optical flat 13, the reflected component 22 of the input beam 20 simultaneously passes to the off-axis beam sampling device 14 in a direction that is antiparallel (i.e., collinear but in the opposite direction) to the return beam 21'. The off-axis beam sampling device 14 generates two angularly separated beams 24 and 25 in a manner described hereinafter in connection with FIG. 2. The two angularly separated beams 24 and 25 are directed back to the first beam splitter 12. The paths of the two angularly separated beams 24 and 25 leaving the beam sampling device 14 are located symmetrically on opposite sides of the reflected component 22 of the input beam 20 entering the beam sampling device 14.

The first beam splitter 12 transmits components 24' and 25', respectively, of the angularly separated beams 24 and 25 leaving the beam sampling device 14. A conventional lens system 26 focusses the transmitted components 24' and 25' as well as the return beam 21' to different postions on the detector plane 23.

If the transmitted component 21 of the input beam 20 is incident perpendicularly upon the optical flat 13, the transmitted components 24' and 25' of the angularly separated beams 24 and 25 have the same angular deviation on opposite sides of the return beam 21'. However, if the transmitted component 21 of the input beam 20 is not incident perpendicularly upon the optical flat 13 (as would occur when the optical elements of the system 10 are misaligned), the components 24' and 25' would have different angular deviations from the return beam 21'. In the case of misaligned optical elements, the return beam 21' would be tilted toward one or the other of the components 24' and 25'. Quadrant detectors 27, 28 and 29 are located at the detector plane 23 to enable the angular deviations of the components 24' and 25' from the return beam 21' to be measured.

The paths of the various beam components through an optical alignment apparatus of the present invention are illustrated in FIG. 2 in which a particular embodiment of the off-axis beam sampling device 14 is shown in detail. The beam sampling device 14 comprises a second beam splitter 30, a first planar mirror 31, an optical wedge 32, a roof mirror 33 having reflective surfaces 34 and 35 intersecting at a right angle, and a planar mirror 36. As indicated in the legend provided in FIG. 2, triple-dashed lines are used to indicate the path of the transmitted component 21 of the input beam 20 and the path of the return beam 21'. Double-dashed lines are used to indicate the path of the beam 24 and the path of its component 24' transmitted by the first beam splitter 12. Quadruple-dashed lines are used to indicate the path of the beam 25 and the path of its transmitted component 25' transmitted by the first beam splitter 12.

The first beam splitter 12 is shown in FIG. 2 mounted inside a housing 40, which has an entrance aperture 41 for passage of the input beam 20 from the source 11 to the first beam splitter 12, and which has an exit aperture 42 for passage of the transmitted component 21 from the first beam splitter 12 through the optical system 10 to the optical flat 13. Upon reflection at the optical flat 13, the transmitted component 21 returns through the aperture 42 to the first beam splitter 12, which produces the return beam 21'.

The quadrant detector 27 is positioned at the detector plane 23 to detect the precise location at which the centroid of the return beam 21' comes to a focus on the detector plane 23. Similarly, the quadrant detector 28 is positioned at the detector plane 23 to detect the precise location at which the centroid of the beam component 24' from the beam sampling device 14 comes to a focus on the detector plane 23, and the quadrant detector 29 is positioned at the detector plane 23 to detect the precise location at which the centroid of the beam component 25' from the beam sampling device 14 comes to a focus on the detector plane 23.

Signals from the detectors 27 and 28 are processed by conventional means to indicate the angular deviation of the beam component 24' from the return beam 21', and signals from the detectors 27 and 29 are likewise processed by conventional means to indicate the angular deviation of the beam component 25' from the return beam 21'. The detectors 27, 28 and 29 are illustrated as quadrant detectors mounted inside the housing 40, and are connected by electrical connectors passing through the housing 40 to appropriate electronic circuitry. In alternative embodiments, the quadrant detectors 27, 28 and 29 could be replaced by other kinds of electro-optical sensor systems capable of detecting the image centroids of the three focussed beam components 21', 24' and 25'.

The operation of the off-axis beam sampling device 14 is indicated by the beam paths shown in FIG. 2. The reflected component 22 of the input beam 20 is shown passing to the second beam splitter 30, which divides the reflected component 22 into the beams 24 and 25. The beam 24, as indicated by the double-dashed line, is transmitted by the second beam splitter 30 to the second planar mirror 36. The beam 25, as indicated by the quadruple-dashed line, is reflected by the second beam splitter 30 to the first planar mirror 31.

The second planar mirror 36 and the roof mirror 33 in combination function as a corner cube to displace the beams 24 and 25 retroreflectively. Thus, the transmitted beam 24, after impinging upon the second planar mirror 36, passes to the reflective surface 35 and thence to the reflective surface 34 of the roof mirror 33. The reflective surface of the second planar mirror 36 and the reflective surfaces 35 and 34 of the roof mirror 33 are disposed with respect to each other so that the beam 24 emerges from the reflective surface 34 generally antiparallel (i.e., parallel but opposite in direction) to its direction when incident upon the second planar mirror 36. After emerging from the reflective surface 34, the beam 24 passes through the optical wedge 32 and proceeds to the first planar mirror 31.

The optical wedge 32 refracts the beam 24 by an amount determined by the geometry and the index of refraction of the optical wedge 32. This refractive effect introduces a small angular deviation from antiparallelism into the beam 24 incident upon the first planar mirror 31 relative to the direction of the beam 24 incident upon the second planar mirror 36. The beam 24, as refracted by the optical wedge 32, is turned through 90° by the first planar mirror 31, and proceeds back to the second beam splitter 30. A portion of the beam 24 is thereupon reflected by the second beam splitter 30 to the first beam splitter 12, and a portion of that reflected portion of the beam 24 is transmitted by the first beam splitter 12 as the transmitted beam component 24'.

The transmitted component 24' is angularly offset from the return beam 21' by an amount determined by the refraction introduced by the optical wedge 32. The foregoing description of the operation of the off-axis beam sampling device 14 ignores refractive effects introduced by the various optical elements other than the optical wedge 32. However, for purposes of analyzing the operation of the beam sampling device 14, the net refractive effect introduced by all the optical elements thereof may be lumped with the refractive effect introduced by the optical wedge 32. Thus, an optical alignment apparatus according to the present invention is tolerant of refractive inhomogeneities in the various optical components of the beam sampling device 14, because any refractive effect introduced by such inhomogeneities can be considered as having been introduced by the optical wedge 32.

The beam 25, after being turned through 90° by the first planar mirror 31, passes through the optical wedge 32 to the reflective surface 34 and thence to the reflective surface 35 of the roof mirror 33. The optical wedge 32, which may be considered as a lumped refractive element for the beam sampling device 14, introduces a small angular deviation to the beam 25. The refracted beam 25, after reflection from the surface 35, passes to the second planar mirror 36, and thence to the first beam splitter 30. A portion of the beam 25 is transmitted by the second beam splitter 30 to the first beam splitter 12; and a portion of that transmitted portion of the beam 25 is transmitted by the first beam splitter 12 as the transmitted beam component 25'.

The transmitted beam component 25', like the transmitted beam component 24', is angularly offset from the return beam 21' by an amount determined by the refraction introduced by the optical wedge 32. In the absence of the optical system 10, or when the optical system 10 is interposed in the transmitted component 21 and the optical elements of the system 10 are properly aligned, the angular offset experienced by the transmitted beam component 25' is equal but symmetrically opposite to the angular offset experienced by the transmitted beam component 24'. In other words, the beam components 24' and 25' are deviated by the same angular amount but on opposite sides of the return beam 21'. However, if the optical elements of the system 10 are misaligned, the beam components 24' and 25' are angularly offset by different amounts from the return beam 21'.

The lens system 26 focusses the beam components 24' and 25' as well as the return beam 21' onto different locations on the detector plane 23. The detectors 27, 28 and 29 indicate any change in the angular offsets of the beam components 24' and 25' from the return beam 21', and thereby indicate any misalignment of the optical elements of the system 10.

As seen in FIG. 2, the beams 24 and 25 travel along oppositely directed paths through the off-axis beam sampling device 14. The amount of refraction introduced by the optical wedge 32 (considered as a lumped refractive element) is precisely the same for each of the beams 24 and 25. However, because the beams 24 and 25 are traveling in opposite directions, the net angular deviation experienced by the beam 24 is symmetrically opposite the net angular deviation experienced by the beam 25.

A view of an optical alignment apparatus of FIG. 2 is shown in FIG. 3 in orthographic projection on a plane through the optic axis of the system 10. The paths of the beams 24 and 25 through the beam sampling device 14 are both illustrated in FIG. 3. Another view of the same optical alignment apparatus is shown in FIG. 4 in orthographic projection on a plane perpendicular to the projection plane of FIG. 3. Since the projections of the paths of the beams 24 and 25 coincide on the projection plane of FIG. 4, only the path of the beam 24 through the beam sampling device 14 is illustrated in FIG. 4.

As would be readily appreciated by practitioners in the art of optical engineering, the second beam splitter 30 and the first planar mirror 31, which are shown as individual elements in FIG. 2, could be replaced as indicated in FIG. 5 by a solid glass periscope 50 having a 45° reflective surface 51 (corresponding to the partially reflective surface of the second beam splitter 30) and a reflective surface 52 (corresponding to the reflective surface of the first planar mirror 31). However, the reflective surface 52 is not a 45° surface, but rather is oriented at some angle other than 45° in order to introduce a refractive effect. Thus, the surface 52 actually corresponds in function to the reflective surface of the first planar mirror 31 and also to the optical wedge 32 of the embodiment shown in FIG. 2.

Likewise, the roof mirror 33 and the second planar mirror 36 of the embodiment shown in FIG. 2 could be replaced by a solid glass corner cube 53 having a reflective surface 54 corresponding to the reflective surface 34 and a reflective surface 55 corresponding to the reflective surface 35 of the roof mirror 33, and also having a reflective surface 56 corresponding to the reflective surface of the second planar mirror 36. An embodiment using such solid glass elements 52 and 53 would be especially advantageous in applications where ruggedness is required.

It would also be apparent to a practitioner skilled in the art of optical engineering, having learned of the present invention, that an apparatus according to the present invention has applications other than merely for aligning optical elements in an optical system. An apparatus according to the present invention could be used, for example, to determine antiparallelism of two independent optical beams. Thus, with reference to FIG. 1, the optical system 10 and the optical flat 13 could be replaced by an independent source that emits beam 21 toward the first beam splitter 12. The beams 20 and 21 would then represent the two independent beams whose antiparallelism is to be determined. In operation, the orientation of the beam 21 relative to the orientation of the beam 20 (or vice versa) would be adjusted (i.e., fine-tuned) so that the angular offset of the component 25' on one side of the return beam 21' equals the angular offset of the component 24' on the other side of the return beam 21'. Such an apparatus could have application in, e.g., aligning beams emitted by laser devices mounted on independently operated earth-leveling machines.

Particular embodiments have been described herein for an optical alignment apparatus according to the present invention. The dimensions and orientations of the constituent elements of the optical alignment apparatus, as well as the configurations of the supporting structures for the constituent elements, would depend upon the intended application. Other embodiments suitable for particular applications would become apparent to practitioners skilled in the art upon perusal of the foregoing specification and the accompanying drawing. The foregoing description is therefore illustrative of the invention, which is more generally defined by the following claims and their equivalents.

I claim:

1. An apparatus for use in aligning optical elements of an optical system along an optic axis of said system, said apparatus comprising:
   (a) a first beam splitter for dividing an optical input beam into a transmitted component and a reflected component, said first beam splitter introducing said transmitted component of said input beam into said system on said optic axis;
   (b) an optical flat for returning said transmitted component of said input beam through said system to said first beam splitter for reflection of a portion of said transmitted component of said input beam away from said optic axis as a return beam, said return beam being collinear with but having a direction opposite to said reflected component of said input beam.,
   (c) detector means disposed to intercept said return beam; and
   (d) a beam sampling device disposed to intercept said reflected component of said input beam, said beam sampling device generating two angularly separated beams and returning said two angularly separated beams to said first beam splitter, said first beam splitter transmitting a portion of each of said two angularly separated beams to said detector means, said detector means indicating angular deviation of each of said angularly separated beams from said return beam, a difference between the angular deviations of said two angularly separated beams from said return beam being a measure of misalignment of the optical elements of said system.

2. The apparatus of claim 1 wherein said beam sampling device comprises a second beam splitter, a first planar mirror, a roof mirror and a second planar mirror; said beam sampling device being disposed so that said reflected component of said input beam is divided by said second beam splitter into a reflected portion and a transmitted portion; said reflected portion of said reflected component of said input beam being reflected successively by said first planar mirror, by said roof mirror and by said second planar mirror; said transmitted portion of said reflected component of said input beam being reflected successively by said second planar mirror, by said roof mirror and by said first planar mirror; a portion of said reflected portion of said reflected component of said input beam being transmitted by said second beam splitter to said first beam splitter; a portion of said transmitted portion of said reflected component of said input beam being reflected by said second beam splitter to said first beam splitter; said portion transmitted by said second beam splitter to said first beam splitter and said portion reflected by said second beam splitter to said first beam splitter each having an angular offset from said reflected component of said input beam, said angular offsets being caused by refractive effects introduced in transmitting said reflected and transmitted portions of said reflected component of said input beam through said beam sampling device; the angular offset of said portion transmitted by said second beam splitter to said first beam splitter being substantially equal to the angular offset of said portion reflected by said second beam splitter to said first beam splitter; a portion of each of the portions transmitted and reflected by the second beam splitter to the first beam splitter being transmitted by the first beam splitter to said detector means, said portions transmitted by the first beam splitter to the detector means being said angularly separated beams whose angular deviations from said return beam provide said measure of misalignment of the optical elements of said system.

3. The apparatus of claim 1 wherein said detector means comprises:
   (a) a lens system for focussing said return beam and said two angularly separated beams onto three different locations on a detector plane, and (b) a sensor system for detecting said three different locations on said detector plane on which said return beam and said two angularly separated beams are focussed.

4. The apparatus of claim 3 wherein said sensor system comprises three quadrant detectors, each one of said quadrant detectors being disposed to indicate an image centroid of a corresponding one of said return beam and said two angularly separated beams.

5. An apparatus for indicating antiparallelism of an optical beam emitted by a first source with respect to an optical beam emitted by a second source, said apparatus comprising:
  (a) detector means for sensing relative positions of centroids for three different optical beam components at a detector surface;
  (b) a beam sampling device disposed away from said beams emitted by said first and second sources;
  (c) beam splitting means for reflecting a component of said beam emitted by said first source toward said detector means and for reflecting a component of said beam emitted by said second source toward said beam sampling device, said beam component that is reflected toward said detector means being substantially antiparallel to said beam component that is reflected toward said beam sampling device, said beam component that is reflected toward said beam sampling device being divided by said beam sampling device into two further beam componets, said two further beam components being returned by said beam sampling device to said beam splitting means so that said two further beam components are angularly offset by equal amounts on opposite sides of said beam component that is reflected toward said beam sampling device, said beam splitting means transmitting said two further beam components toward said detector means; and
  (d) focussing means for focussing each of said two further beam components as well as said component of said beam emitted by said first source to corresponding positions on said detector surface.

6. The apparatus of claim 5 wherein said detector means comprises three quadrant detectors located at said detector surface, each quadrant detector being disposed to sense the centroid of a corresponding one of said two further beam components and said component of said beam emitted by said first source.

7. The apparatus of claim 5 wherein said focussing means comprises a lens system for focussing each one of said two further beam components and said component of said beam emitted by said first source upon said detector surface.

8. The apparatus of claim 5 wherein said beam sampling device comprises structure providing a beam splitting surface, a first planar reflecting surface, roof-mirror reflecting surfaces and a second planar reflecting surface; said beam sampling device being disposed so that said beam component that is reflected toward said beam sampling device is divided by said beam splitting surface into a reflected portion and a transmitted portion; said reflected portion being reflected successively by said first planar reflecting surface, by said roof-mirror reflecting surfaces, and by said second planar reflecting surfaces; said transmitted portion being reflected successively by said second planar reflecting surface, by said roof-mirror reflecting surfaces, and by said first planar reflecting surfaces; a component of said reflected portion being transmitted by said beam splitting surface to said beam splitting means; a component of said transmitted portion being reflected by said beam splitting surface to said beam splitting means; said components reflected and transmitted by said beam splitting surface of said beam sampling device to said beam splitting means each having an angular offset from said beam component reflected toward said beam sampling device; said angular offsets being caused by refractive effects introduced in transmitting said components through said beam sampling device; the angular offset of said component of said reflected portion transmitted by said beam splitting surface being substantially equal to the angular offset of said component of said transmitted portion reflected by said beam splitting surface when said beams emitted by said first and second sources are antiparallel.

* * * * *